(12) United States Patent
Robbie et al.

(10) Patent No.: US 12,602,721 B2
(45) Date of Patent: Apr. 14, 2026

(54) DYNAMIC PRICING FOR LIVESTOCK SALES

(71) Applicant: Montana Cattle ConneXion, LLC, Park City, MT (US)

(72) Inventors: Boe Scott Robbie, Billings, MT (US); Scott Wesley Robbie, Park City, MT (US)

(73) Assignee: MONTANA CATTLE CONNEXION, LLC, Park City, MT (US)

( * ) Notice: Subject to any disclaimer, the term of this patent is extended or adjusted under 35 U.S.C. 154(b) by 309 days.

(21) Appl. No.: 18/364,351

(22) Filed: Aug. 2, 2023

(65) Prior Publication Data

US 2025/0045814 A1  Feb. 6, 2025

(51) Int. Cl.
*G06Q 30/00* (2023.01)
*G06Q 30/0201* (2023.01)
*G06Q 30/0601* (2023.01)

(52) U.S. Cl.
CPC ..... *G06Q 30/0641* (2013.01); *G06Q 30/0206* (2013.01)

(58) Field of Classification Search
CPC ................................................. G06Q 30/0641
See application file for complete search history.

(56) References Cited

U.S. PATENT DOCUMENTS

2016/0027130 A1* 1/2016 Leachman ......... G06Q 30/0206
705/7.35

FOREIGN PATENT DOCUMENTS

AU 2016102341 A4 * 5/2017

OTHER PUBLICATIONS

Wang, Leishi, et al. "Optimal breeding strategy for livestock with a dynamic price." Mathematics 10.10 (2022): 1732.*
Hijriani, Astria, et al. "Strategy and Development of the ePakan Business Model as a Marketplace for Livestock Feed and Livestock Products." (2019).*

* cited by examiner

*Primary Examiner* — Kathleen Palavecino

(74) *Attorney, Agent, or Firm* — Thomas | Horstemeyer, LLP

(57) ABSTRACT

A dynamic pricing system that uses user inputs, variables and API Data from a Mercantile Exchange system to formulate an up to the minute asking price on a commodity listing is described. In one example, the system includes a computing device that is configured to execute a website application. The website application is configured to receive a request to display a web page for a client device and transmit an application programming interface (API) request to an exchange computing device. An API response is received from the exchange computing device with a first market rate. A price for the listing is determined for a first time period and displayed on a web page. A second API request is automatically transmitted to the exchange computing device for the listing in response to an expiration of the first time period.

20 Claims, 8 Drawing Sheets

| Live Cattle Crush Formula | |
|---|---|
| Region: | 1 |
| Shipping Point Zip Code | 59063 |
| Head Count | 220 |
| Base Sale Weight | 825 |
| Ship Date | February-22 |
| Average Daily Gain | 3 |
| Finish Weight (Frame) | 1375 |
| Gross WT of Lot | 181,500 |
| Total Weight to Gain | 550 |
| Days on Feed | 183 |
| Approx. Finish Date | August-22 |
| Live Cattle Futures Prices | $138.50 |
| Finish $$/Head | $1,904.38 |
| Spot Corn Futures | $6.40 |
| Cost of Gain | $1.22 |
| Total Cost to Feed | $713.31 |
| Mileage | 860 |
| Freight Rate | $4.50 |
| Freight CST | $44.51 |
| Dollars per Head | $1,191.07 |
| Sales Prices: | $144.37 |

| Feeder Basis Formula | |
|---|---|
| Head Count | 50 |
| Base Sale Weight | 600 |
| Ship Date | January-22 |
| Basis | -6 |
| Lot Size | 30000 |
| CME Feeder Contract Price | $178.98 |
| Lot Size Premium | -2.00% |
| Sales Prices | 169.4 |

145

133

402

204

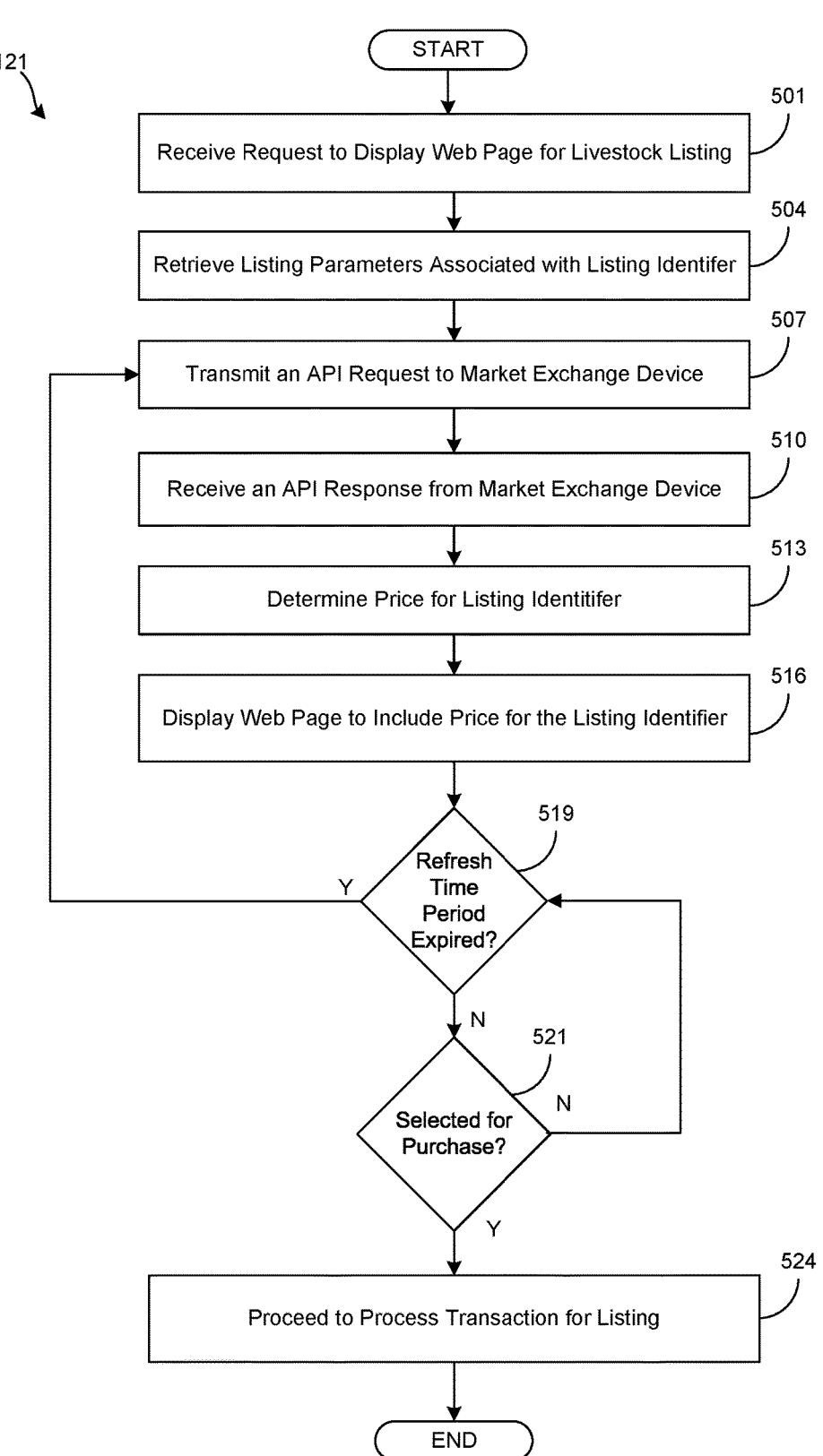

121

START

501
Receive Request to Display Web Page for Livestock Listing

504
Retrieve Listing Parameters Associated with Listing Identifer

507
Transmit an API Request to Market Exchange Device

510
Receive an API Response from Market Exchange Device

513
Determine Price for Listing Identitifer

516
Display Web Page to Include Price for the Listing Identifier

519
Refresh Time Period Expired?

Y

N

521
Selected for Purchase?

N

Y

524
Proceed to Process Transaction for Listing

END

START

601

Receive Request to Display a Web Page to Create Livestock Listing

604

Display New Listing Web Page

607

Receive Listing Type

610

Display User Interface Component For Listing Type

613

Receive Listing Parameters

616

Activate the Listing on the Livestock Web Page

END

DYNAMIC PRICING FOR LIVESTOCK SALES

BACKGROUND

Operating a livestock business requires substantial capital investment and a tremendous amount of time and effort. Producing a single calf crop spans over a year, demanding dedication, planning and resources. The livelihoods of cattle producers are intertwined with a myriad of risks, influenced by unpredictable external factors such as the weather, global commodity markets and politics. These uncertainties can significantly impact the profitability and sustainability of their operations. Compounding these challenges is the fact that most cattle operations typically receive just one paycheck per year, when they finally sell their calf crop. Oftentimes, livestock producers rely solely on the cash market at live auctions to sell cattle, which can be volatile and very risky for producers, especially those with fewer cattle to sell. With fewer numbers to offer, smaller producers can struggle to get a fair price. All producers can be subjected to heavy discounts due to weather, truck availability, buyer attendance and other outside factors not directly associated with supply and demand.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4A and 4B are tables that illustrate different dynamic pricing calculations for a dynamic website for livestock transactions according to various embodiments of the present disclosure.

FIG. 5 is a flowchart illustrating one example of functionality implemented as portions of website service executed in a computing environment in the networked environment of FIG. 1 according to various embodiments of the present disclosure.

DETAILED DESCRIPTION

Figure 1:
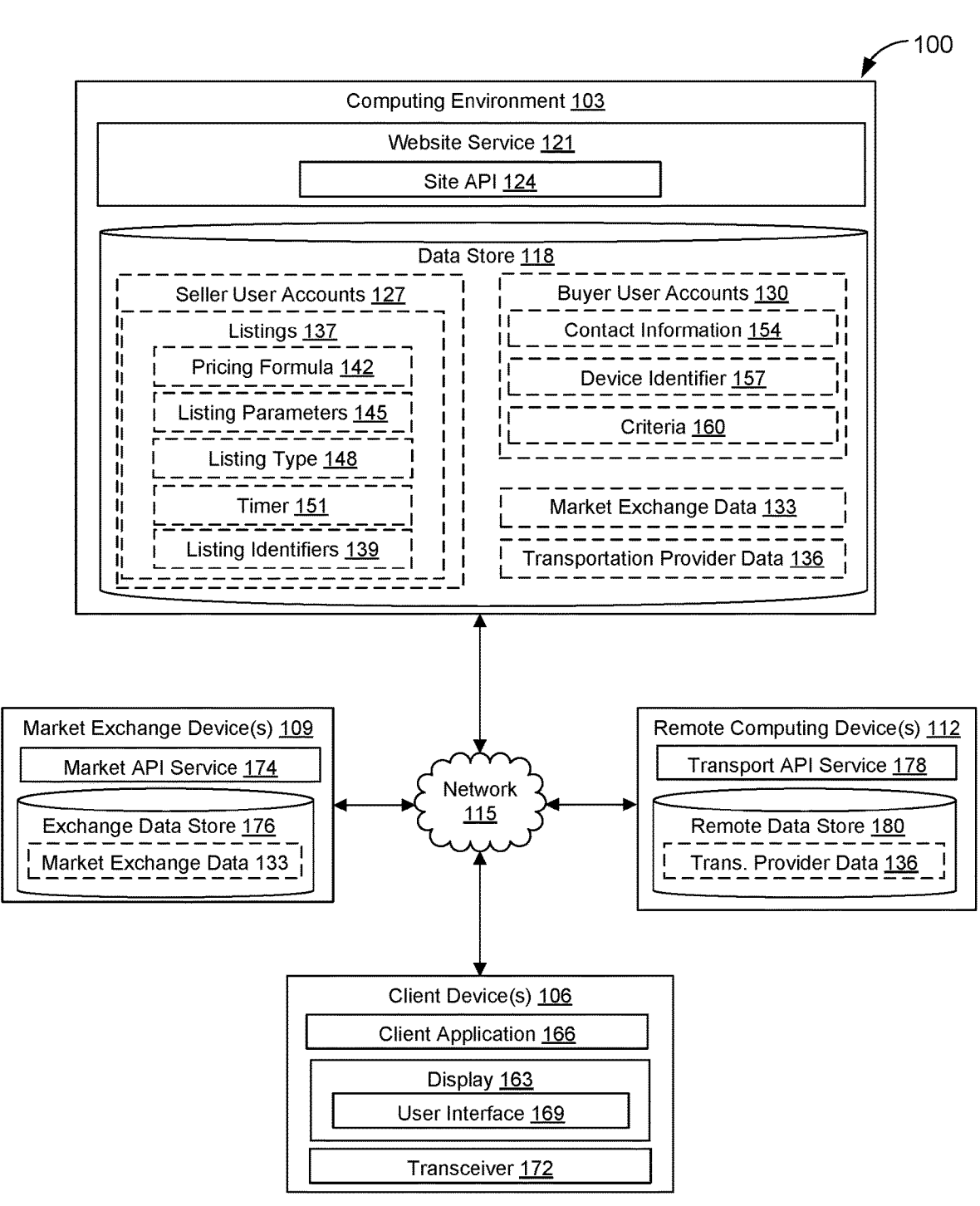
FIG. 1 is a drawing of a networked environment according to various embodiments of the present disclosure.

The embodiments of the present disclosure relate to a website or a user interface with dynamic mechanisms (e.g., real-time pricing tool) for initiating and coordinating agriculture transactions. As a form of risk management, livestock producers can forward contract their calves for sale at a delivery date in the future. However, this option is not available to all producers, mostly just the larger ranches that can sell full semi truckloads of a single kind or sex.

However, the majority of feeder cattle come from smaller operators who do not have the volume to forward contract their cattle for a fair price. This means fewer marketing options and less selling power. During the fall, the sheer volume of feeder cattle for sale overwhelms the infrastructure of marketing outlets and available transport for the livestock. Cattle prices are volatile, as is the nature of any commodity, but, during different times of the year, they can become extremely volatile. Prices can change dramatically over the course of several hours. Sellers' proceeds may be dramatically affected simply by the time of day that the cattle sell.

Most cattle, if not sold via forward contract, are sold by live auction. Sellers become hostage to the huge volume of seasonal supplies and lack of infrastructure and transport options available to them. They have no choice but to take the final bid when the auctioneer's hammer falls. Many cattle bring a price far below fair market value simply due to the lack of other marketing options.

For example, a United States Department of Agriculture (USDA) Market report in one location showed a $30 per cwt price change on the same grade, sex and weight class of a single category of similar quality calves. The dollar value per head varied $180 each in a single day! The average producer usually has 25-50 calves to sell. This can drop a producer's expected sale proceeds by $9,000 or more simply due to the time of day that the cattle sell.

The embodiments of the present disclosure benefit different marketers of many different multi-variable commodities. It will allow all producers a mechanism to fairly price and market their given commodities. As in one non-limiting example, producers can forward contract their cattle and lock in fair market value any time of the year.

The embodiments of the present disclosure include a new dynamic pricing mechanism based on product information, formulas, and application programming inputs (API) from commodity exchanges. Dynamic pricing is an alternative to fixed pricing and occurs when prices are free to respond to changes, for example, in supply and demand. An example of a simple dynamic pricing system would be an electronic stock exchange (NYSE or CBOT). Electronic commodity exchanges facilitate the sales of standardized commodities. These standardized contracts are not useful to most producers because of the absence of any complex variable elements. For example, most livestock cannot be represented by a single futures contract because of Total volume represented in the contract, Variability in Average Weight, Value based on health management practices and vaccination protocols, Variability in expected performance based on breed, age, sex or condition, and the perishable nature and high carrying costs associated with livestock production. Economists know that setting fixed prices may hinder sales, especially due to the volatile nature of Livestock & Commodity markets. Producers may run the risk of leaving money on the table, or ending up with unsold inventory and unable to effectively market their perishable inventory in a timely manner. By using a combination of information provided by the seller, formulas and APIs from outside data; the mechanism will formulate a fair market value asking price on a livestock sales listing site with the ability for a buyer to execute the purchase of the forward contract at the click of a button. Prices can change on an interval basis (e.g., every 10 seconds) due to the regular stream of new data coming in from the Chicago Mercantile Exchange or other suitable exchange markets. In the following discussion, a general description of the system and its components is provided, followed by a discussion of the operation of the same.

With reference to FIG. 1, shown is a networked environment 100 according to various embodiments. The networked environment 100 includes a computing environment 103, a client device 106, a market exchange device 109, and a remote computing device 112, which are in data communication with each other via a network 115. The network 115 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 118 that is accessible to the computing environment 103. The data store 118 may be representative of a plurality of data stores 118 as can be appreciated. The data stored in the data store 118, for example, is associated with the operation of the various applications and/or functional entities described below.

The components executed on the computing environment 103, for example, include a website service 121, and other applications, services, processes, systems, engines, or functionality not discussed in detail herein. The website service 121 is executed to display various user interfaces (e.g., web pages, mobile applications) on a client device that allows users to view and create livestock listings. The website service 121 can provide dynamic pricing of the livestock listings based on the real-time data being provided from the market exchange device 109. For example, the real-time market data can be provided to the computing environment on an interval of every ten minutes. The real-time market data can be used to automatically adjust the price of a listing.

The website service 121 can include a site application programming interface (API) 124 for interfacing with the market exchange device 109 and the remote computing device 112. The site API 124 can represent API functionality, libraries, and other suitable software routines for automatically requesting or retrieving data from the market exchange device 109 and/or the remote computing device 112. For example, the site API 124 can represent software routines that automatically identify a particular listing type and determine which data to request from the market exchange device 109 based on the listing type.

In another example, the site API 124 can represent software routines that automatically identify a livestock transaction that has been completed for a particular listing and retrieve data related to potential transportation vendors that are available for transporting the purchased livestock. In this non-limiting example, the site API 124 can automatically identify parameters associated with the livestock transaction and use the identified parameters to retrieve data on available transportation providers for transporting the livestock. In some embodiments, the site API 124 can be omitted because the API functionality is included in the website service 121.

The data stored in the data store 118 includes, for example, a seller user account 127, buyer user account 130, market exchange data 133, transportation provider data 136, and potentially other data. The seller user account 127 can represent a user account for users that can create website listings 137 for selling livestock. Each listing 137 can represent a posting of livestock that are available for sale on a website. The embodiments of the present disclosure include options, such as a seller can decide whether to use a fixed price or a dynamic pricing component. The seller user account 127 can store different parameters, settings, and other suitable data for operating the livestock listing on a website. Each listing 137 can include listing identifiers 139, a pricing formula 142, listing parameters 145, a listing type 148, a timer 151, and other suitable data for a listing 137.

The listing identifier 139 can represent a unique identifier for each listing 137 associated with a particular seller user account 127. The pricing formula 142 can represent one or more pricing algorithms used to dynamically determine a price of a listing based on real-time data. In some embodiments, the seller can select the pricing formula 142 that can be used for the listing 137. In other embodiments, the website service 121 can select a pricing formula 142 based on one or more listing parameters 145 or other suitable conditions. Some non-limiting examples of pricing formulas 142 can be a feeder cattle basis pricing formula, live cattle basis pricing, Feeder Cattle Formula, Breeding Cattle Formula and other suitable pricing formulas 142.

The listing parameters 145 can represent parameters associated with the lists 137. In some examples, the listing parameters 145 can be used for the dynamic price calculations. Some non-limiting examples of listing parameters 145 can include a cattle head count, base weight, ship date, basis, lot size, sex, breed, frame size, flesh condition, health protocol, market contract prices (e.g., from a market exchange device 109), lot size premium, average daily gain, finish weight, total weight to gain, days on feed, finish date, market cattle future price (e.g., from a market exchange device 109), finish dollars per head, cost of gain, cost to feed, mileage, freight rate, freight cost per head, dollars per head, and other suitable data. Additionally, the listing parameters 145 can include data that is derived from the previous listed parameters and from the inputs provided by the user for creating a listing 137.

The listing type 148 can represent a type of listing 137. The type of listing 137 can refer to a pricing type, such as fixed or dynamic. With dynamic pricing, there can be multiple types of dynamic pricing that is selected by the seller user or can be automatically determined. Additionally, the listing type 148 can refer to a type of livestock that is available for purchase.

The timer 151 can represent a time period that is configured to request (e.g., via an API request) updated market exchange data 133 from the market exchange device 109. For example, the timer 151 can represent a ten minute interval for requesting market exchange data 133 from the market exchange device 109 (e.g., via an API request). In some instances, the timer 151 can be set to a different interval/periodic value. In other instances, the site API 124 may request market exchange data 133 from the market exchange device 109 upon demand in response to particular events, such as a request to view a web page that includes a particular listing. In some embodiments, the timer 151 is omitted and the market exchange device 109 is configured to automatically transmit market exchange data 133 on an interval basis to the computing environment 103.

The buyer user account 130 can represent one or more user accounts for users that purchase one of the listings 137. In most examples, the user may need a user account. For example, a user may have a buyer user account 130 because of frequent purchases and in order to store user preferences. The buyer user account 130 can include contact information 154, a device identifier 157, criteria 160, and other suitable data.

The contact information 154 can include name, address, email address, phone number, and other suitable contact information. The device identifier 157 can represent a unique identifier for a computing device associated with the user, such as a mobile device, a laptop, and other suitable devices. The device identifier 157 can represent a phone number, an Internet Protocol (IP) address, a client application identifier, a device serial number, and other suitable identifying device information.

The criteria 160 can include stored preferences that a buyer has for a purchase. In some examples, the buyer can store the criteria 160 related to livestock and the website service 121 can notify the buyer when a listing 137 matches their stored criteria 160. Some non-limiting examples can include ship date, price, base weight, geographical region, livestock types, livestock sex, head count, and other suitable criteria/preferences.

The market exchange data 133 can represent real-time or substantially real-time pricing data from one or more commodity exchanges, such as the Chicago Mercantile Exchange, New York Mercantile Exchange, and other suitable sources of commodities. In some embodiments, the market exchange data 133 can be used for dynamic pricing calculations for the listings 137. The market exchange data 133 can be received from the market exchange device 109.

The transportation provider data 136 can represent data on transportation options for transporting livestock that has been purchased from one or more of the listings 137. The data can include schedules on available vehicles, location data (e.g., present location, future locations) of available vehicles, occupancy status, costs, size of vehicle, and other suitable vehicle information. In some non-limiting examples, the website service 121 can facilitate the coordination of a buyer selecting a transportation option for a purchase. The transportation provider data 136 can be received from the remote computing device 112. The transportation provider data 136 can be provided on an interval basis, on-demand, and other suitable occasions.

The client device 106 is representative of a plurality of client devices 106 that may be coupled to the network 115. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 163. The display 163 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client device 106 can also include a transceiver 172 for communicating over the network 115 to the computing environment 103, the market exchange device 109, the remote computing device 112, and other device. The transceiver 172 can represent a hardware device for conducting wireless communication such as WiFi, cellular, Bluetooth, Zigbee, and suitable wireless communication protocols.

The client device 106 may be configured to execute various applications such as a client application 166 and/or other applications. The client application 166 can be executed to display the user interface 169 for the website service 121. For example, the client application 166 can be a mobile application with dedicated functionality for the website service 121. For example, the client application 166 can be used to receive alerts of new or relevant listings 137 for the buyer. The client application 166 can display the alerts on the user interface 169 or notify the user in other means, such as by vibration, an audible sound, and other methods.

The client application 166 can also be executed in a client device 106, for example, to access network content served up by the computing environment 103 and/or other servers, thereby rendering a user interface 169 on the display 163. To this end, the client application 166 may comprise, for example, a browser, a dedicated application, etc., and the user interface 169 may comprise a network page, an application screen, etc. The client device 106 may be configured to execute applications beyond the client application 166 such as, for example, email applications, social networking applications, word processors, spreadsheets, and/or other applications.

The market exchange device 109 can represent one or more computing devices for a commodities market exchange (e.g., Chicago Mercantile Exchange). The computing devices may be a server or multiple computing devices of a cloud computing network. The market exchange device 109 can include a market API service and an exchange data store 176. The market API service 174 can serve as an API interface to the website service 121 for market exchange data request. The exchange data store 176 can store market exchange data 133 (e.g., real-time or substantially real time data) that is associated with the commodities market exchange.

The remote computing device 112 can represent one or more computing devices for a transportation provider. The computing devices may be a server or multiple computing devices of a cloud computing network. The remote computing device 112 can include a transport API service 178 and a remote data store 180. The remote data store 180 can store transportation provider data 136. The transportation provider data 136 can represent data associated with scheduling transportation services for a buyer of a livestock listing 137.

In some embodiments, the pricing mechanism will use the unique options and variables entered so each listing will have a unique price changing every ten minutes based on the updated API information retrieved from the CME. The mechanism will use multiple variables and inputs to calculate the sales price. The mechanism will allow buyers to purchase at the calculated price and execute the sale of the contract at the last price listed.

There will be several formulas used depending on the region, class and weight of the cattle being offered. For example, a basis formula can be directly correlated to a single futures contract. As another example, a valuation formula can be a calculation using multiple variables and the relationships between multiple futures contracts, such as Corn and Live Cattle.

In some embodiments, the website service 121 can use the site API 124 to update a pricing component for a listing 137. Various formulas can be used to update the pricing component (e.g., see FIG. 2 (204)). In one embodiment, feeder cattle future basis pricing (as referred to as a feeder basis formula e.g., in FIG. 4B) is used for updating the listing 137. Feeder cattle future basis pricing can include calculating and describing the formulation of cattle priced with a basis off the Feeder Cattle futures. The feeder cattle future basis pricing can include one or more of the following factors:

Head Count and Base Weight are user inputs to find the volume of the lot Size and calculate price per pound.

Approximate Ship date is used to connect to the corresponding monthly futures contract price to the lot.

Basis is a calculated, flat rate premium or discount based on location or kind used to account for outside factors that influence the value of the listing described.

Lot Size is used to calculate a volume premium or discount associated with the listing. This information is used to determine how many semi trucks would be needed to transport the livestock.

CME Feeder Cattle Contract Price is the API input for the associated standardized Feeder cattle contract month with the last posted price with a 10 minute delay.

Lot Size Premium is an original calculation to assign a premium or discount based on volume to account for the variability of the size and quality of the cattle sold and the associated freight costs. Lower volume equals discounts and higher volume means potential premiums. Premiums capped at 1%, discounts capped at 5%.

Final Sales Price is the Reported CME Price of the given futures contract with any premiums/discounts applied through the basis or assigned by lot size.

In another example, live cattle basis pricing can be used. Live Cattle future basis pricing can include calculations describing the formulation of cattle priced with a basis off the Live Cattle futures. The live cattle future basis can be used for dynamically updating the listing 137. The live cattle future basis pricing can include one or more of the following factors:

Head Count and Base Weight are used to find the volume of the lot Size

Approximate Ship date is used to connect the next monthly futures contract price to the lot.

Basis is an assigned, flat rate premium or discount based on location, sex, kind or breed used to account for outside factors that influence the value of the listing described.

Lot Size is used to calculate a volume premium or discount associated with the listing. This information is used to determine how many semi trucks would be needed to transport the livestock.

CME Live Cattle Contract Price is the API input for the associated standardized Live cattle contract month with the last posted price with a 10 minute delay.

Lot Size Premium is an original calculation to assign a premium or discount based on volume to account for the variability of the size and quality of the cattle sold and the associated freight costs. Lower volume equals discounts and higher volume means potential premiums. Premiums capped at 1%, discounts capped at 2.5%.

Final Sales Price is the Reported CME Price of the given futures contract with any premiums/discounts applied through the basis or assigned by lot size.

In another example, the Feeder Cattle Valuation formula can be used for updating a price component for a listing. Feeder Cattle Valuation formula can include calculations that factor the cost associated with raising cattle. In one embodiment, feeder cattle valuation formula (as referred to as a Feeder Cattle formula e.g., in FIG. 4A) can be used for dynamically updating the listing 137. The feeder cattle valuation formula can include one or more of the following factors:

Shipping Point Zip Code—Shipping location used to calculate mileage to the central feeding area and calculate freight costs. Also contributes to the Basis formulas as defined in different areas by the local economic factors.

Head Count—used in the formulation of the lot size and Lot size premium

Base Sale Weight—Average weight, user input variable used in multiple formulas: Calculating final price per pound, number of pounds to gain, total lot size, freight costs Approximate Ship date—used as the starting date to calculate finish date and associated futures contract month. Also used to find corresponding corn input contract.

Age, Sex, Frame, Health and Breed factors. All factors influencing gain, conversion coefficient and finish weight variables to calculate value.

Average Daily Gain—variable influenced by age, sex and breed to project finish date.

Finish Weight—variable influenced by the age, sex, breed and frame size. Used in several instances of the equation to determine end value of the finished animal as well as how much weight needs to be gained.

Lot Size is used to calculate a volume premium or discount associated with the listing.

Total Weight to Gain—formula calculation finding the difference between finish weight and the base weight. Used as variable to determine cost to feed and time to finish.

Days on Feed—Formula calculation found by dividing weight to gain by average daily gain. Result used to project finish date from approximate ship date.

Approximate finish date—formula calculation projecting finish date by adding the days on feed to the approximate shipping date. Used to find the end value via Live Cattle Futures price API.

Live Cattle Futures Price—API Input for the Last Reported CME Price of the given/next Live Cattle futures contract corresponding to the calculated approximate finish month.

Finish Dollars per Head—Formula finding the end total value of the finished animal by multiplying finish weight by finish price.

Corn Futures Price—API Input of next corn contract price. Used to calculate estimated input costs.

Cost of Gain—Original formula to estimate input costs per pound of weight to gain using corn prices multiplied by an original coefficient based on conversion coefficient.

Conversion Coefficient—original formula developed to evaluate feed conversion by an animal determined by age, sex, health and breed factors.

Cost to feed—Total feed Input costs. Uses Cost of gain estimate multiplied by total weight to gain to reach finish weight.

Mileage—API Calculation finding driving distance to central feeding area from shipping point.

Freight Rate—standard but editable variable by super admin to calculate freight costs. Varies seasonally based on economic factors.

Freight Cost per head—result of mileage multiplied by freight rate to equal total freight cost, divided by 50,000 lbs. to figure cost per pound multiplied by base sale weight to figure out estimated freight per head.

Base price per CWT—dollars per head divided by the base sale weight to find base sale price before basis, freight, breed, health and lot size adjustments.

Lot Size Premium is an original calculation to assign a premium or discount based on volume to account for the variability of the size and quality of the cattle sold and the associated freight costs. Lower volume equals discounts and higher volume means potential premiums. Premiums capped at 1%, discounts capped at 5%.

Final Sales Price is the Base Price per cwt of the listing with any premiums/discounts applied by basis, freight, breed, health and lot size adjustments.

In another example, Lightweight feeder cattle valuation formula can be used for updating pricing in real-time for the listing. Lightweight feeder cattle valuation formula can include calculations describing the formulation of cattle priced with a breakeven analysis, working backwards off of the Feeder Cattle futures. The Lightweight feeder cattle valuation formula can be used for dynamically updating the listing 137. The Lightweight feeder cattle valuation formula can include one or more of the following factors:

Shipping Point Zip Code—Shipping location used to calculate mileage to the central feeding area and calculate freight costs. Also contributes to the Basis formulas as defined in different areas by the local economic factors.

Head Count—used in the formulation of the lot size and Lot size premium

Base Sale Weight—Average weight, user input variable used in multiple formulas: Calculating final price per pound, number of pounds to gain, total lot size, freight costs.

Approximate Ship date—used as the starting date to calculate finish date and associated futures contract month. Also used to find corresponding corn input contract.

Age, Sex, Frame, Health and Breed factors. All factors influencing gain, conversion coefficient and finish weight variables to calculate value.

Average Daily Gain—variable influenced by age, sex and breed to project finish date.

Finish Weight—variable influenced by the age, sex, breed and frame size. Used in several instances of the equation to determine end value of the finished animal as well as how much weight needs to be gained.

Lot Size is used to calculate a volume premium or discount associated with the listing.

Total Weight to Gain—formula calculation finding the difference between finish weight and the base weight. Used as variable to determine cost to feed and time to finish.

Days on Feed—Formula calculation found by dividing weight to gain by average daily gain. Result used to project finish date from approximate ship date.

Approximate finish date—formula calculation projecting finish date by adding the days on feed to the approximate shipping date. Used to find the end value via Live Cattle Futures price API.

Feeder Cattle Futures Price—API Input for the Last Reported CME Price of the given/next Feeder Cattle futures contract corresponding to the calculated approximate finish month.

Finish Dollars per Head—Formula finding the end total value of the finished animal by multiplying finish weight by finish price.

Corn Futures Price—API Input of next corn contract price. Used to calculate estimated input costs.

Cost of Gain—Original formula to estimate input costs per pound of weight to gain using corn prices multiplied by an original coefficient based on conversion coefficient.

Conversion Coefficient—original formula developed to evaluate feed conversion by an animal determined by age, sex, health and breed factors.

Cost to feed—Total feed Input costs. Uses Cost of gain estimate multiplied by total weight to gain to reach finish weight.

Mileage—API Calculation finding driving distance to central feeding area from shipping point.

Freight Rate—standard but editable variable by super admin to calculate freight costs. Varies seasonally based on economic factors.

Freight Cost per head—result of mileage multiplied by freight rate to equal total freight cost, divided by 50,000 lbs. to figure cost per pound multiplied by base sale weight to figure out estimated freight per head.

Base price per CWT—dollars per head divided by the base sale weight to find base sale price before basis, freight, breed, health and lot size adjustments.

Lot Size Premium is an original calculation to assign a premium or discount based on volume to account for the variability of the size and quality of the cattle sold and the associated freight costs. Lower volume equals discounts and higher volume means potential premiums. Premiums capped at 1%, discounts capped at 5%.

Final Sales Price is the Base Price per cwt of the listing with any premiums/discounts applied by basis, freight, breed, health and lot size adjustments.

Next, a general description of the operation of the various components of the networked environment 100 is provided. To begin, a seller user may desire to sell their livestock later in the year. The seller user can log into their seller user account 127 and create a livestock listing 137 on a website provided by the website service 121. The website can display one or more web pages (see e.g., FIGS. 3A and 3B) that allow the seller user to enter information associated with livestock, such as livestock type, livestock description, listing type 148 (e.g., dynamic pricing type), geographic region, head count, base weight, ship date, shipping zip code, and other suitable factors. In one non-limiting example, the seller user may select the listing type 148 for feeder basis formula, which is one of multiple dynamic pricing options available for the seller user. In some non-limiting examples, the website service 121 can receive a selection by the seller user to use dynamic pricing. In this example, the website service 121 can select a particular dynamic pricing option for the listing 137 based on the listing parameters 145 and other data that has been provided by the seller user. In this example, the website service 121 may automatically select the dynamic pricing option in order to simplify the process for the seller user. The website service 121 may automatically select the dynamic pricing option based on historical data of other seller user accounts 127 and a trained machine learning model. The trained machine learning model can identify the listing parameters 145 provided by the seller user as inputs for the model. The training machine learning model can select or suggest a dynamic pricing option based on the inputs. The trained machined learning model can use one or more classifications algorithms such as logistic regression, naive bayes, K-nearest neighbors, decision tree, support vector machines, and other suitable classification algorithms. In some instances, the seller user may also upload images or video of the livestock to the website service 121 for the listing 137.

After the information for the listing 137 has been entered, the seller user can click to save or activate the listing 137. The entered data for the listing 137 can be stored in the data store 118. The website service 121 can generate a listing identifier for the listing 137. Subsequently, the listings 137 can be accessible to a client device 106 via the website provided by the website service 121.

Then, a buyer user can operate a client device 106 to view the livestock listings 137 that are available on the website. In some examples, the buyer user can enter a search criteria for a livestock query. In other examples, the buyer user can scroll and view different listings 137 that are provided on the website.

When a dynamic pricing option has been selected for a particular listing 137, the website service 121 can dynamically update the price for the particular listing 137. For example, the particular listing 137 can be using a feeder basis pricing formula as a dynamic pricing option. This dynamic pricing option may rely on getting market exchange data 133 in real-time from the Chicago Mercantile and Exchange (e.g., market exchange device 109). The website service 121 can make an API request from the Chicago Mercantile and Exchange on a ten minute interval. In response to each request, the Chicago Mercantile and Exchange can send an API response to the website service 121. The API response can include the market exchange data 133.

The website service 121 can determine the price for the particular listing 137 using the feeder basis pricing formula based on the market exchange data 133. The price can be displayed on a web page that includes the listing 137. The website service 121 can update the price for the listing 137 as new market exchange data 133 is received every ten seconds by the website service 121. In some instances, the price for a particular listing 137 can update even without a webpage refresh.

In one non-limiting example, a buyer user can configure their buyer user account 130 to transmit a notification of livestock listings 137 that meet a user-specified criteria. For example, the user-specified criteria can include a price threshold, a cattle type, and other suitable factors. Upon the user-specified criteria being met, the website service 121 can transmit a notification to a client device 106 of the buyer user. In some instances, the notification can activate the client application 166 (e.g., web browser, a mobile application associated with the website service 121) to display one or more listings 137 that meet the buyer's criteria.

Figure 2:
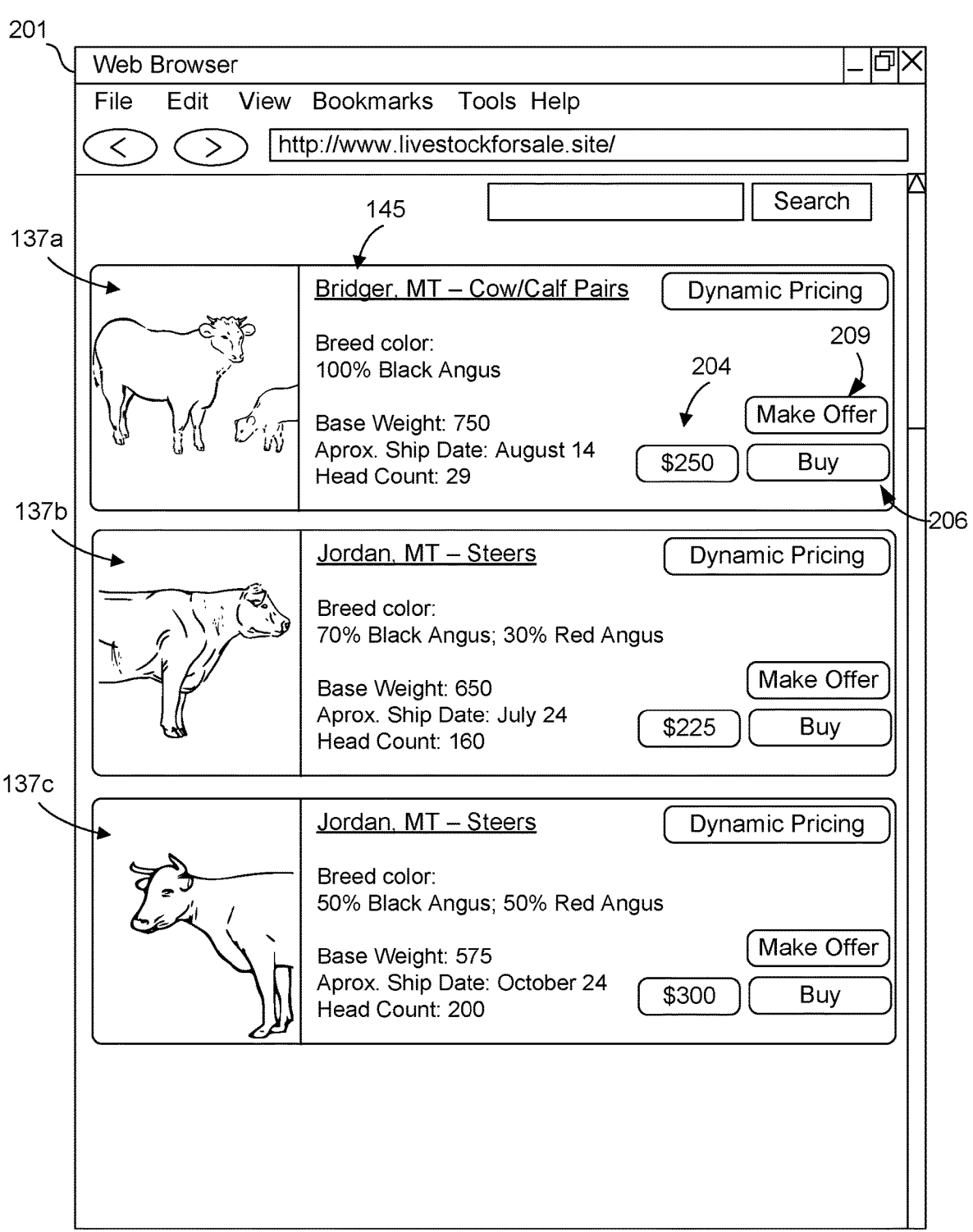
FIG. 2 is an example user interface of a dynamic website for livestock transactions displayed by a client device in the networked environment of FIG. 1 according to various embodiments of the present disclosure.

Referring next to FIG. 2, shown is an example user interface 201 (e.g., web page) of multiple listings 137*a*-137*c*. Each listing 137 can include an image of the livestock, listing parameters 145, pricing component 204, a buy component 206, an offer component 209, and other suitable user interface components.

The listing parameters 145 can include a description of the livestock for sale and other information. The listing parameters 145 displayed are entered by the seller user while creating the listing 137 (e.g., see FIGS. 3A and 3B). As shown in FIG. 2, the listing 137 can include listing parameters 145 such as base weight, an approximate ship date, the head count, and other parameters. In some embodiments, the website service 121 can dynamically determine which listing parameters 145 to display based on a user search query, the display size of the client device 106, dynamic pricing conditions, and other suitable factors.

The pricing component 204 can represent an area for displaying the price of the listing 137. In some embodiments, the user can select whether the price is fixed or will use dynamic pricing. With dynamic pricing, the pricing component 204 can dynamically update the price of the listing 137 based on market conditions reflected in real-time data provided by the market exchange device 109. The pricing component 204 can be updated on an interval time period, on-demand, based-on triggering events, and on other suitable occasions. For example, the pricing component 204 can be set to update based on receiving market exchange data 133 from the market exchange device 109 every ten minutes.

As a result, in some examples, the pricing component 204 can be updated or the user interface (e.g., web page) can be refreshed automatically when the ten minute interval is reached. In some instances, the seller user can set the update interval. Thus, the multiple listings 137 on the same user interface 201 can be updated at different interval rates or they can all be updated at the same time. When the buy component 206 is selected by the user, the website service 121 can identify the current price by the pricing component 204. The offer component 209 can be selected to place a bid on the livestock described for the listing 137.

Figure 3A:
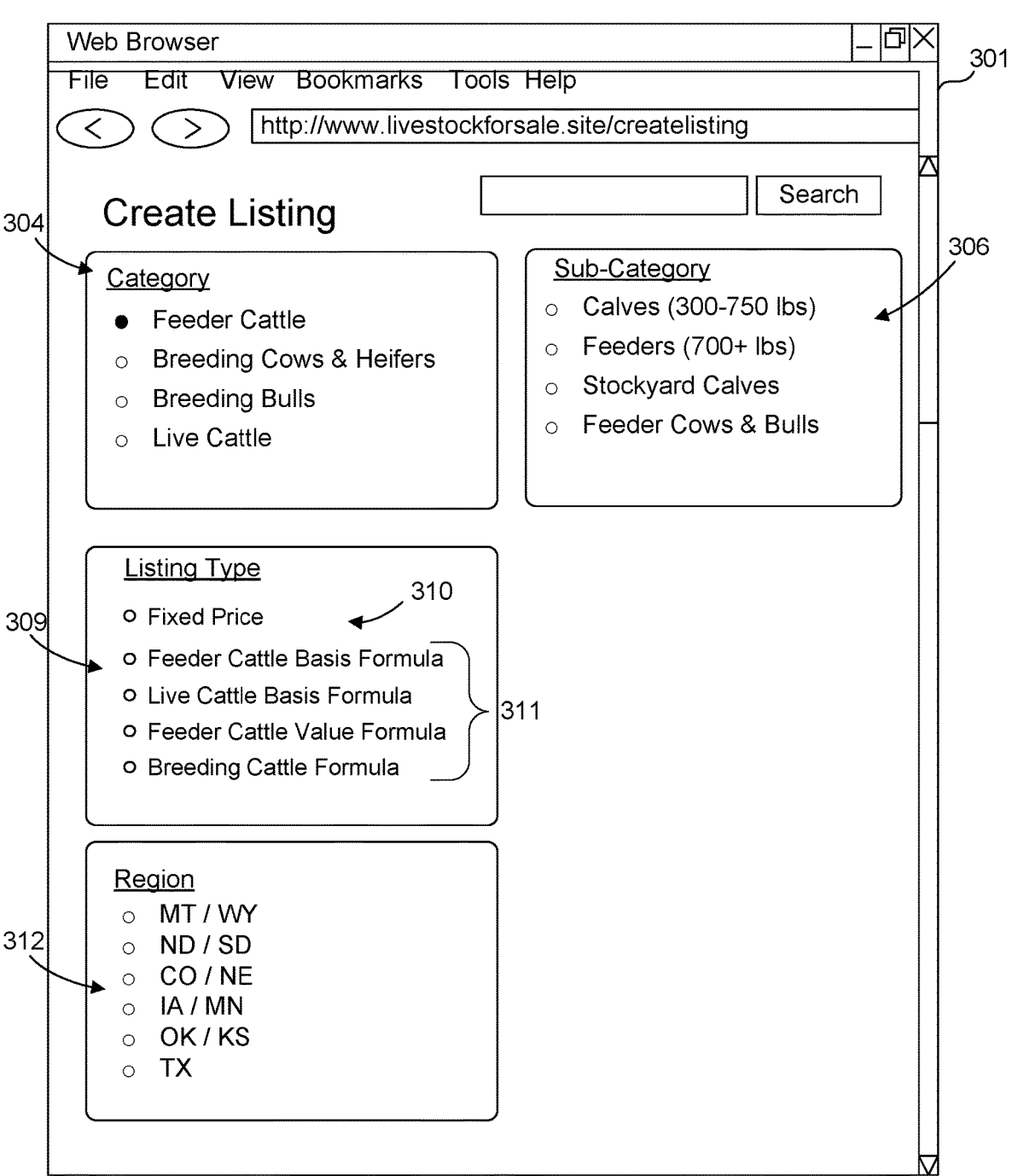
FIGS. 3A and 3B are example user interfaces for creating a livestock listing on a client device in the networked environment of FIG. 1 according to various embodiments of the present disclosure.
Figure 3B:
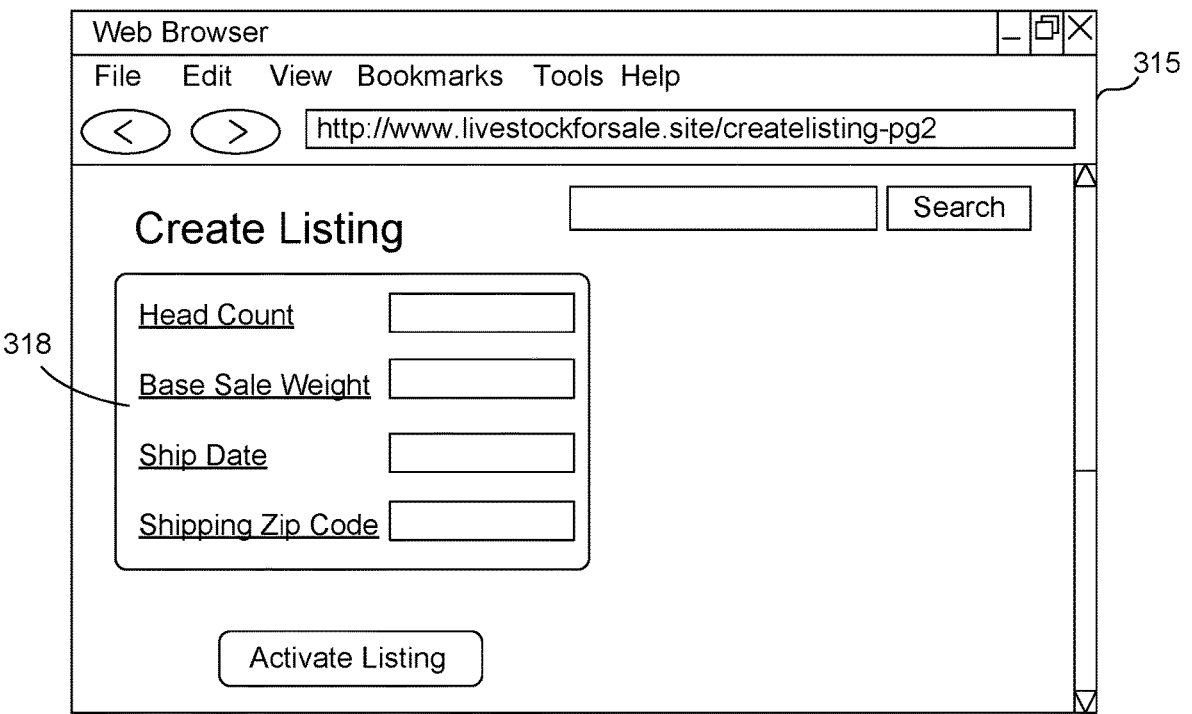

Turning now to FIGS. 3A and 3B, shown are examples user interfaces for creating a listing 137 for a livestock transaction. FIG. 3A can represent a first user interface 301 for an initial web page for creating a listing 137. As shown in FIG. 3A, the first user interface 301 includes various components for receiving listing parameters 145 and other information for creating a listing 137. For instance, the first user interface 301 can include a category section 304, a sub-category section 306, a listing type section 309, a region section 312, and other suitable sections.

The category section 304 can be configured to receive a selection or a data entry of the livestock type. In the illustrated example, the categories include feeder cattle, breeding cows and heifers, and live cattle. FIG. 3A illustrates that the feeder cattle item is selected. A selection in the category section 304 can dynamically cause a sub-category section 306 to become visible for selection of additional information. In FIG. 3A, the sub-category section 306 provides for a selection of a type of feeder cattle.

Next, the listing type section 309 can provide for a price selection for the listing 137. In the illustrated example, the listing type section 309 can include a fixed price option 310 and one or more dynamic price options 311. The dynamic price options 311 can allow the seller user to select a formula or a method of determining the dynamic price. As shown in FIG. 3A, some non-limiting examples of dynamic price options 311 include a live cattle formula, a feeder basis formula, a feeder Cattle Valuation formula, a live basis formula, and other suitable calculation methods. Each dynamic price option 311 may factor in particular listing parameters 145, particular market exchange data 133, and other suitable data.

Each dynamic pricing option 311 may be best suited for a certain livestock scenario. Some examples of livestock scenarios can include a breeding cattle formula for breeding cattle, a feeder cattle valuation formula or feeder basis formula, a live cattle formula for live cattle, and other suitable scenarios. For example, the feeder basis formula option may factor the head count, the base weight, the ship date, and the basis into the dynamic price calculation. The live cattle formula may include a different set of listing parameters. In some non-limiting examples, the website service 121 can automatically select a dynamic pricing option 311 based on the listing parameters 145 provided by the seller user. In this example, the listing type section 309 may be omitted. The region section 312 can allow the seller user to select a geographic region for the present location of the livestock.

FIG. 3B illustrates a second user interface 315 for creating a listing 137. The second user interface 315 can be displayed for allowing the seller user to enter additional listing parameters 145. In the illustrated example, FIG. 3B displays an additional listing parameter section 318. In the additional listing parameter section 318, FIG. 3B shows there are data entry fields for head count, base sale weight, ship date, and shipping zip code. The data entry fields for the second user interface 315 can vary.

Moving on to FIGS. 4A and 4B, shown are example tables of different pricing formulas used for providing the dynamic pricing for a listing 137. FIG. 4A includes a table for the Feeder Cattle Valuation Formula. As a first non-limiting example, the Feeder Cattle Valuation Formula can include multiple listing parameters 145 for determining the pricing component 204 (e.g., sales price). Additionally, the pricing component 204 can be updated in real-time or substantial real-time (e.g., a periodic interval, event-based, on-demand, and other suitable timing intervals) based on the market exchange data 133. For instance, the website service 121 can receive or retrieve a particular live cattle future price on an interval of every ten seconds. The particular live cattle future price can be received or retrieved based on the ship date associated with the listing 137. Some examples of listing parameters 145 for the Feeder Cattle Valuation formula include one or more of the items listed in the table of FIG. 4A (see also the previous factor mentioned for Feeder Cattle Valuation formula).

The Feeder cattle formula is a complex algorithm which performs a series of calculations based on user inputs and data fetched from APIs to determine the Final Sales price. User Inputs: Age, Sex, Ship Date, Head Count, Base Sale Weight and Location Basis. Based on the combination of Age and Sex factors provided by the user, several values will be tied to the factors to establish estimated finish weight; establish the Feed Conversion Coefficient; establish Daily gain variables that will be used later to calculate feed costs and project future finish weights and Dates. Location Basis determined by the Zip Code of the User against a chart of Basis factors. Ship date will be used to calculate the number of days on feed and the corresponding price of the nearest Live Cattle futures contract and the corresponding Corn price Futures contract.

Gross Lot weight: The algorithm calculates the gross lot weight by multiplying the head count (A) with the base weight (C). This represents the total weight of the cattle lot. Used in an original equation to calculate a lot size premium and/or discount.

Total weight to finish: Based on the combination of selected age and sex, the algorithm determines the finish weight. For Example, if steers are selected, the finish weight is set to 1400 lbs. For heifers, the finish weight is set to 1300 lbs. Age Selection will change the finish weight depending on the age used. The total weight to finish is then calculated by subtracting the base weight (C) from the finish weight (F).

Days on Feed: The algorithm calculates the number of days required for the cattle to reach the finish weight. This is done by dividing the total weight to finish (G) by Daily gain, which is also another factor determined by user selections of age and sex.

Finish Date: Using the shipping date (D) and the days on feed (G), the algorithm determines the finish date. It adds the days on feed to the shipping date to obtain the projected date when the cattle will reach the finish weight.

Live Price: The algorithm fetches the CME Live cattle contract price from an API. It retrieves the price corresponding to the finish date (H) or the next available contract month if the finish date falls outside contract months. This step provides the live cattle price for valuation.

End Value: The algorithm calculates the end value by multiplying the live price (I) with the finish weight (F). This represents the projected value of the cattle at the desired finish weight.

Corn price: Similar to the live price, the algorithm fetches the CME Corn price for the median contract month between the selected shipping date and projected finish date. This price is used for calculating the cost of gain.

Cost of Gain: The algorithm calculates the cost of gain by multiplying the corn price (K) with a conversion coefficient (L). The conversion coefficient varies depending on the selected sex & age. For steers, the conversion factor is 0.0018, while for heifers, it is 0.0020. Age Selection will change the finish weight depending on the age used. This step determines the cost of feed required to achieve the desired weight gain.

Total Cost to feed: The algorithm calculates the total cost to feed by multiplying the total weight to gain (F) with the cost of gain (L). This represents the overall cost of feeding the cattle to reach the finish weight.

Estimated Value per cwt: The algorithm calculates the estimated value per hundredweight (cwt) by subtracting the total cost to feed (M) from the end value (J) and then dividing the result by the base weight (C). This step provides an estimate of the value achieved per unit weight of the cattle.

Lot Size premium: The algorithm determines the lot size premium based on the gross lot weight (E). It calculates the premium as the minimum value between ((Gross lot weight−50,000)/1,000,000) and 1%. This step introduces an original premium based on the lot size, ensuring fairness in pricing.

Final Price: Finally, the algorithm calculates the final price by multiplying the estimated value per cwt (N) with (1+lot size premium)−Location Basis. This step accounts for the premium and provides the ultimate price estimation for the cattle lot.

This Algorithm runs in real time and is updated with new inputs via Live Cattle and Corn Futures Price APIs to modify the sale price every ten seconds.

FIG. 4B illustrates a table for a feeder basis formula. The feeder basis formula can include multiple listing parameters 145 for determining the pricing component 204 (e.g., sales price). The factors or listing parameters 145 can vary from the previous example. Some examples of listing parameters 145 for the feeder basis formula can include the head count, base sale weight, the ship date, the basis, and other suitable parameters.

Additionally, the pricing component 204 can be updated in real-time or substantial real-time (e.g., a periodic interval, event-based, on-demand, and other suitable timing intervals) based on the market exchange data 133. For instance, the website service 121 can receive or retrieve a particular live Chicago Mercantile Exchange (CME) feeder contract price on an interval of every ten minutes. The CME feeder contract price can be received or retrieved based on the ship date associated with the listing 137.

The feeder basis formula can be calculated as Feeder Cattle Futures Price API, determined by ship date plus (+) Basis. Basis is a User input factor personally used in risk management of a lot of feeder cattle.

Further, the feeder basis formula can include a lot size premium 402 condition that is determined for the feeder cattle formula. In some embodiments, the lot size premium 402 can be used to assign a premium (e.g. price increase) or a discount (e.g. price decrease) for the pricing component 204 based on one or more of the listing parameters 145, such as the lot size, the head count, the base weight, or other suitable factors. In some examples, the lot size premium 402 can be determined based on a lot size for the most economical price for freight shipping. Often times, cattle are shipped with a semi-truck. A full semi-load truck may hold 50,000 to 60,000 lbs. of cattle. A full semi-truck load fetches the best price for the sellers. Unlike many other industries, the cattle industry rewards Premiums for high volume. Not discounts. Thus, the feeder cattle valuation formula or the other pricing formulas 142 (e.g., listing types 148) can assign a discount (e.g., price decrease) if the cattle lot size is less than a full semi-truck load that would incur higher freight charges. Additionally, the feeder cattle formula or the other pricing formulas 142 (e.g., listing types 148) can assign a premium (e.g., price increase) if the cattle lot size meets a full semi-truck load or goes beyond. In one example, a listing 137 with a cattle lot size of 60,000 lbs. may be assigned a one percent price increase to the pricing component 204 because it has the volume for a full semi-truck load.

In another example, a listing 137 with a cattle lot size of 45,000 lbs. may be assigned a discount (e.g., price decrease) that is related to the amount remaining for a full semi-truck load size. For instance, the difference between the 45,000 lbs. cattle lot size and the full semi-truck load lot size can be determined. The difference can be divided by 1000000 to calculate the percent of the discount. In FIG. 4B, the lot size premium 402 is determined to be −2.0% based on the lot size and an assumed full semi-truck load. The −2.0% was applied to the pricing component 204, which resulted in a sales price of $169.40 after the −2.0% discount was applied.

Referring next to FIG. 5, shown is a flowchart that provides one example of the operation of a portion of the website service 121 according to various embodiments. It is understood that the flowchart of FIG. 5 provides merely an example of the many different types of functional arrangements that may be employed to implement the operation of the portion of the website service 121 as described herein. As an alternative, the flowchart of FIG. 5 may be viewed as depicting an example of elements of a method implemented in the computing environment 103 (FIG. 1) according to one or more embodiments.

Beginning with box 501, the website service 121 can receive a request to display a web page for one or more livestock listings 137 (e.g., see FIG. 2). The website service 121 can receive the request from the client device 106. The request can include a uniform resource locator address for a particular web page. The web page can be associated with one or more listing identifiers 139 that will be displayed on the web page. In some examples, the listing identifiers 139 can be determined from a query requested by the user.

In box 504, the website service 121 can retrieve listing parameters 145 associated with the listing identifier 139 for the requested web page. The website service 121 can retrieve listing parameters 145 from the data store 118 using the listing identifiers 139. In some examples, the listing parameters 145 can indicate that dynamic pricing is to be used for a particular listing 137. The listing parameter 145 can also include an indication for a listing type 146. For example, the listing type 146 can indicate that dynamic pricing will be used for the listing 137.

In some examples, the listing type 148 can specify a particular dynamic pricing technique or formula (see. e.g., FIG. 3A (311)). In these examples, the dynamic pricing technique or formula that is specified can be used to determine which market exchange data 133 to retrieve. For instance, if the feeder basis formula has been selected, then the website service 121 can request the CME feeder contract price, for example. In another instance, if the live Cattle Valuation formula has been selected, then the website service 121 can determine to request the Live Cattle Future price.

In box 507, the website service 121 can transmit an API request to the market exchange device 109. Prior to transmitting the request, the website service 121 can generate the request based on one or more listing parameters 145. For example, the API request can be generated based on the listing type 148 and a shipping date. As discussed before, the CME feeder contract price can be needed for the API request because of the listing type 148. Additionally, the website service 121 can determine to request the CME feeder contract price for the month of October based on the ship date for the listing 137 being for October 2. After the API request has been generated, the website service 121 can transmit, via an API call, the request to the market exchange device 109. In some examples, the website service 121 can configure the timer 151 or interval for receiving or requesting the market exchange device 109.

In box 510, the website service 121 can receive an API response from the market exchange device 109. In box 513, the website service 121 can determine a dynamic price for the listing identifier 139 based on the market exchange device 109 and the listing parameters 145.

In box 516, the website service 121 can display the determined pricing component 204 for the listing identifier 139 on the user interface 201 (FIG. 2). In box 519, the website service 121 can determine whether a time period (e.g., for the timer 151) has expired for refreshing the pricing component 204. If the time period has expired, the website service 121 can proceed to the box 507. If the time period has not expired, then the website service 121 can proceed to box 521.

In box 521, the website service 121 can determine whether a user has selected to purchase the listing 137 at the determined price. If the user has not selected the listing 137 for purchase, then the website service 121 can proceed to box 519. If the user has selected the listing 137 for purchase, then the website service 121 can proceed to the box 524.

In box 524, the website service 121 can process the transaction by identifying payment information and executing the transaction at the determined price. In some embodiments, after the purchase has been completed, the website service 121 can identify whether the user requests assistance with coordinating a transportation provider for the purchased livestock.

For example, the website service 121 can retrieve transportation provider data 136 on available transportation providers that match certain conditions associated with the purchased listing 137. For example, the website service 121 can extract the ship date, the base weight, the head count, and the location of the livestock for the listing as conditions for searching for a transportation provider in the transportation provider data. After a search has been complete, the website service 121 can display on the web page one or more transportation options that are available. The user can select one of the options for coordinating the transportation of the purchased livestock for the listing 137. Then, the website service 121 proceeds to the end.

Figure 6:
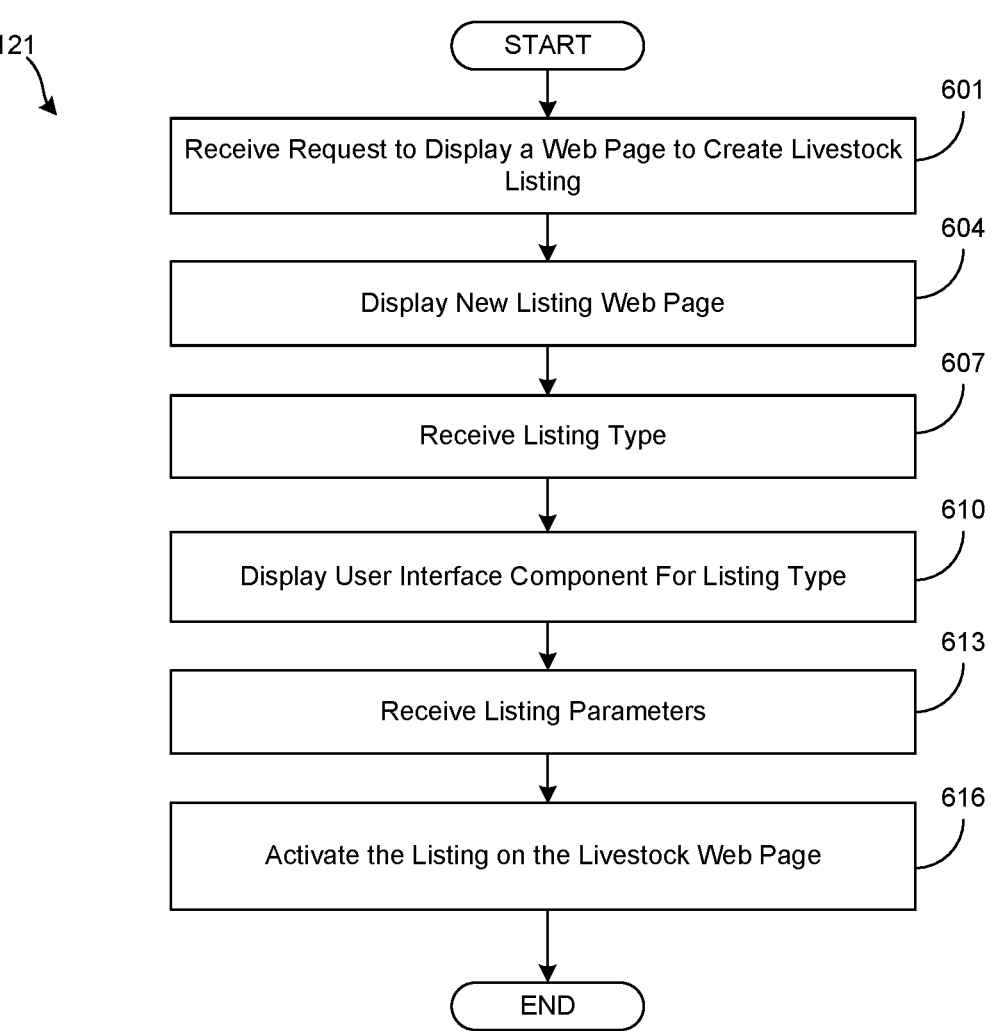
FIG. 6 is a flowchart illustrating another example of functionality implemented as portions of website service executed in a computing environment in the networked environment of FIG. 1 according to various embodiments of the present disclosure.

Referring next to FIG. 6, shown is a flowchart that provides one example of the operation of a portion of the website service 121 according to various embodiments. It is understood that the flowchart of FIG. 6 provides merely an example of the many different types of functional arrangements that may be employed to implement the operation of the portion of the website service 121 as described herein. As an alternative, the flowchart of FIG. 6 may be viewed as depicting an example of elements of a method implemented in the computing environment 103 (FIG. 1) according to one or more embodiments.

Beginning with box 601, the website service 121 can receive a request to display a web page for creating a livestock listing 137. In box 604, the website service 121 can display a new listing web page (e.g., FIG. 3A (first user interface 301)). In box 607, the website service 121 can receive an indication of a listing type 148. In some instances, the listing type 148 can be received from a selection from the listing type section 309.

In box 610, the website service 121 can display user interface components for the listing type 148 selected. For example, if a fixed price listing type is selected, then the website service 121 does not display user interface options related to the dynamic pricing options 311. In another example, if dynamic pricing is selected and a particular type of dynamic pricing is also selected, then the website service 121 can display additional listing parameters 145 related to the particular type of dynamic pricing selected.

In box 613, the website service 121 can receive the listing parameters 145, the listing type 148, and other information entered by the seller user. The collected information can be stored in the data store 118 in association with a listing identifier 139. In box 616, the website service 121 can activate the listing 137 for inclusion in one or more user interfaces 201 (e.g., web pages, mobile application). Then, the website service 121 proceeds to the end.

Figure 7:
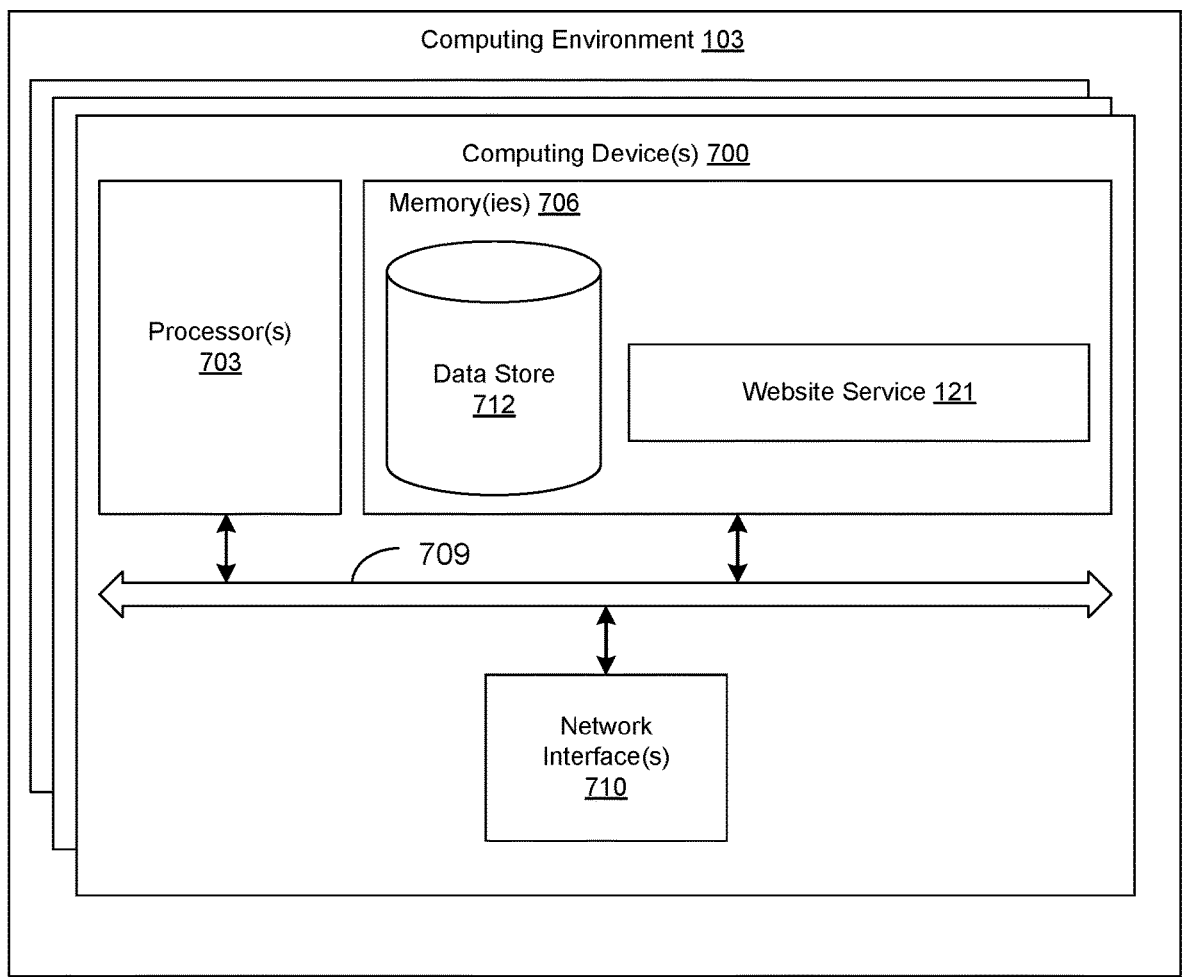
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the website service 121, and potentially other applications. Also stored in the memory 706 may be a data store 712 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the website service 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 6 show the functionality and operation of an implementation of portions of the website service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the website service 121, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the website service 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:

at least one computing device that includes a processor and memory; and an application stored in the memory, wherein when executed by the processor, the application causes the at least one computing device to at least:

receive a request to display a web page for a client device, the web page having a listing for purchasing livestock, the listing being associated with a livestock lot size and a ship date;

transmit a first application programming interface (API) request to an exchange computing device based at least in part on the ship date;

receive a first API response from the exchange computing device, the first API response comprising a first set of real-time market exchange data, wherein the first set of real-time market exchange data comprises a first market rate;

determine, by executing a stored pricing formula, a price for the listing for a first time period based at least in part on the livestock lot size and the first market rate;

display the web page to include the listing, the price for the listing during the first time period, and a purchasing component for purchasing the listing at the price displayed;

automatically transmit a second API request to the exchange computing device for the listing in response to an expiration of the first time period;

receive a second API response from the exchange computing device, the second API response comprising a second set of real-time market exchange data, wherein the second set of real-time market exchange data comprises a second market rate;

determine, by executing the stored pricing formula, an updated price for the listing for a second time period based at least in part on the second market rate; and automatically update the web page to include the updated price for the listing, the purchasing component being associated with the updated price.

2. The system of claim 1, wherein the price for the listing is further determined based at least in part on a listing type for the listing, the listing type being used to determine a livestock calculation type and a plurality of listing parameters for the livestock calculation type.

3. The system of claim 1, wherein the price for the listing is further determined based at least in part on a livestock head count.

4. The system of claim 1, wherein the application, when executed by the processor, causes the at least one computing device to at least:

configure the first API request to request a subsequent monthly contract price based at least in part on the ship date.

5. The system of claim 1, wherein the first time period and the second time period correspond to a periodic interval associated with the exchange computing device.

6. The system of claim 1, wherein the listing is associated with a listing type and the application, when executed by the processor, causes the at least one computing device to at least:

determine a volume premium or discount for the listing based at least in part on the livestock lot size, the volume premium or discount are determined based at least in part on a quantity of trucks needed to transport the livestock lot size; and the price for the listing is further determined based at least in part on the volume premium or discount.

7. The system of claim 1, wherein the first market rate comprising at least one of a feeder contract price, a live cattle contract price, a live cattle future price, or a feeder cattle future price.

8. A method, comprising:

receiving, by a computing device, a request to display a web page for a client device, the web page having a listing for purchasing livestock, the listing being associated with a livestock lot size and a ship date;

transmitting, by the computing device, a first application programming interface (API) request to an exchange computing device based at least in part on the ship date;

receiving, by the computing device, a first API response from the exchange computing device, the first API response comprising a first set of real-time market exchange data, wherein the first set of real-time market exchange data comprises a first market rate;

determining, by the computing device executing a stored pricing formula, a price for the listing for a first time period based at least in part on the livestock lot size and the first market rate;

displaying, by the computing device, the web page to include the listing, the price for the listing during the first time period, and a purchasing component for purchasing the listing at the price displayed;

automatically transmitting, by the computing device, a second API request to the exchange computing device for the listing in response to an expiration of the first time period;

receiving, by the computing device, a second API response from the exchange computing device comprising a second set of real-time market exchange data, wherein the second set of real-time market exchange data comprises, the second API response comprising a second market rate;

determining, by the computing device executing the stored pricing formula, an updated price for the listing for a second time period based at least in part on the second market rate; and automatically updating, by the computing device, the web page to include the updated price for the listing, the purchasing component being associated with the updated price.

9. The method of claim 8, wherein the listing is associated with a listing type and further comprising:

determining a volume premium or discount for the listing based at least in part on the livestock lot size, the volume premium or discount are determined based at least in part on a quantity of trucks needed to transport the livestock lot size; and the price for the listing is further determined based at least in part on the volume premium or discount.

10. The method of claim 8, wherein the price for the listing is further determined based at least in part on a listing type for the listing, the listing type being used to determine a livestock calculation type and a plurality of listing parameters for the livestock calculation type.

11. The method of claim 8, wherein the price for the listing is further determined based at least in part on a livestock head count.

12. The method of claim 8, further comprising:

configuring, by the computing device, the first API request to request a subsequent monthly contract price based at least in part on the ship date.

13. The method of claim 8, wherein the first time period and the second time period correspond to a periodic interval associated with the exchange computing device.

14. The method of claim 8, wherein the first market rate comprising at least one of a feeder contract price, a live cattle contract price, a live cattle future price, or a feeder cattle future price.

15. A non-transitory computer-readable medium embodying a program that, when executed by a processor of at least one computing device, causes the at least one computing device to at least:

receive a request to display a web page for a client device, the web page having a listing for purchasing livestock, the listing being associated with a livestock lot size and a ship date;

transmit a first application programming interface (API) request to an exchange computing device based at least in part on the ship date;

receive a first API response from the exchange computing device, the first API response comprising a first set of real-time market exchange data, wherein the first set of real-time market exchange data comprises a first market rate;

determine, by executing a stored pricing formula, a price for the listing for a first time period based at least in part on the livestock lot size and the first market rate;

display the web page to include the listing, the price for the listing during the first time period, and a purchasing component for purchasing the listing at the price displayed;

automatically transmit a second API request to the exchange computing device for the listing in response to an expiration of the first time period;

receive a second API response from the exchange computing device comprising a second set of real-time market exchange data, wherein the second set of real-time market exchange data comprises, the second API response comprising a second market rate;

determine, by executing the stored pricing formula, an updated price for the listing for a second time period based at least in part on the second market rate; and automatically update the web page to include the updated price for the listing, the purchasing component being associated with the updated price.

16. The non-transitory computer-readable medium of claim 15, wherein the price for the listing is further determined based at least in part on a listing type for the listing, the listing type being used to determine a livestock calculation type and a plurality of listing parameters for the livestock calculation type.

17. The non-transitory computer-readable medium of claim 15, wherein the price for the listing is further determined based at least in part on a livestock head count.

18. The non-transitory computer-readable medium of claim 15, wherein the program, when executed by the processor, causes the at least one computing device to at least:

configure the first API request to request a subsequent monthly contract price based at least in part on the ship date.

19. The non-transitory computer-readable medium of claim 15, wherein the first time period and the second time period correspond to a periodic interval associated with the exchange computing device.

20. The non-transitory computer-readable medium of claim 15, wherein the listing is associated with a listing type and the program, when executed by the processor, causes the at least one computing device to at least:

determine a volume premium or discount for the listing based at least in part on the livestock lot size, the volume premium or discount are determined based at least in part on a quantity of trucks needed to transport the livestock lot size; and the price for the listing is further determined based at least in part on the volume premium or discount.

\* \* \* \* \*